Figures 1, 2:
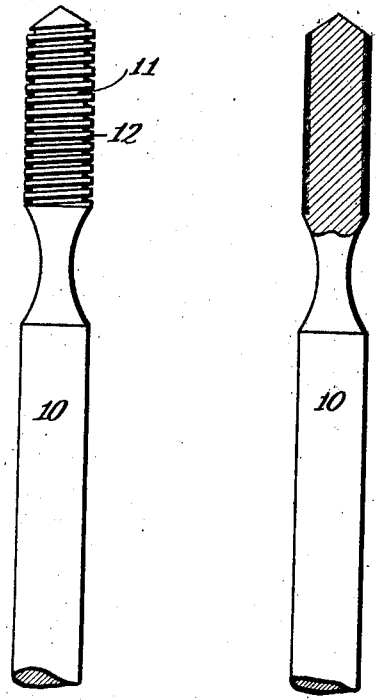

F. KIRSTEN.
METHOD OF MAKING DIAMOND TOOLS.
APPLICATION FILED JAN. 10, 1914.

1,099,984.

Patented June 16, 1914.

UNITED STATES PATENT OFFICE.

FRIEDRICH KIRSTEN, OF DUSSELDORF, GERMANY.

METHOD OF MAKING DIAMOND TOOLS.

1,099,984.  Specification of Letters Patent.  Patented June 16, 1914.

Application filed January 10, 1914. Serial No. 811,321.

*To all whom it may concern:*

Be it known that I, FRIEDRICH KIRSTEN, engineer, a subject of the German Emperor, and residing at 11 Gustav-Poensgen strasse, Dusseldorf, Germany, have invented certain new and useful Improvements in Methods of Making Diamond Tools, of which the following is a specification.

The present invention relates to a method of making diamond drills or mills and the like, which are intended chiefly for dental purposes.

The new method allows of combining the diamond dust or powder directly with the body of the drill without the material of the latter having to be fused, so that also steel may be used in making such drills and tools, which may be subsequently hardened.

In the accompanying drawing: Figure 1 is a side view of the tool-body before being flattened and Fig. 2 a longitudinal section of the tool complete.

The new method consists in the body 10 of the tool being provided at its head with recesses, grooves or other depressions 11. In the accompanying drawing a tool is shown, which is provided with a square screw thread 12 on an enlarged scale. However, the body of the tool may have also any other shape of the tools, drills, mills and the like, used in dental practice. The diamond dust is then mixed with oil or the like so as to give it a certain consistency and is then applied into the grooves 11 of the tool. Thereupon the parts 12 of the tool projecting between the grooves are flattened down by hammering whereby the diamond dust is made to penetrate into the material of the tool. This hammering is continued, while the tool is being constantly revolved, until the outer layer of the still soft steel is thoroughly kneaded up and impregnated with the diamond dust. The body of the tool may then be further worked into the desired shape, as exemplified in Fig. 2, and, if necessary also be hardened.

Instead of hammering the tool it may also be submitted to a pressing action for flattening down the projecting portions.

I claim:

Method of making diamond tools, in particular dental drills and mills, consisting in forming recesses in the body of the tool, filling the recesses with diamond dust, flattening the parts of the tool projecting between said recesses by a suitable treatment, the said flattening treatment being continued until the outer layer of the material of which the tool is made is thoroughly impregnated with the diamond dust, then working the body of the tool into the required shape and prepared for work by hardening and the like.

In testimony whereof I have hereunto affixed my signature in the presence of two witnesses.

FRIEDRICH KIRSTEN.

Witnesses:
 HELEN NUFER,
 ALBERT NUFER.